US006637956B2

(12) United States Patent
Konishi et al.

(10) Patent No.: US 6,637,956 B2
(45) Date of Patent: Oct. 28, 2003

(54) PRINTING APPARATUS AND METHOD

(75) Inventors: Yoshiharu Konishi, Shiojiri (JP); Kiyoshi Ogawa, Tokyo (JP); Nobuyuki Horii, Tokyo (JP)

(73) Assignees: Seiko Epson Corporation, Tokyo (JP); King Jim Co., Ltd., Tokyo (JP)

( * ) Notice: Subject to any disclaimer, the term of this patent is extended or adjusted under 35 U.S.C. 154(b) by 97 days.

(21) Appl. No.: 10/010,753

(22) Filed: Nov. 7, 2001

(65) Prior Publication Data

US 2002/0085870 A1 Jul. 4, 2002

(30) Foreign Application Priority Data

Dec. 12, 2000 (JP) ........................................ 2000-377288

(51) Int. Cl.[7] ................................................. B41J 11/44
(52) U.S. Cl. ............................ 400/76; 400/61; 400/70; 400/615.2
(58) Field of Search ............................. 400/76, 70, 61, 400/615.2

(56) References Cited

U.S. PATENT DOCUMENTS 5,025,397 A * 6/1991 Suzuki ...................... 358/1.18
5,560,718 A * 10/1996 Furuya ........................ 400/68
6,178,003 B1 * 1/2001 Ha ............................. 358/1.14

FOREIGN PATENT DOCUMENTS

JP 56-40895 4/1981
JP 7-186493 7/1995

* cited by examiner

Primary Examiner—Charles H. Nolan, Jr.
(74) Attorney, Agent, or Firm—Hogan & Hartson, LLP

(57) ABSTRACT

There is provided a printing apparatus and method which is capable of printing based on internal data stored within the apparatus or external data inputted from an external storage device, and at the same time capable of setting the enabling/disabling of an automatic power-off function. A tape printing apparatus has a keyboard for entering data indicative of characters and various commands. A RAM stores the data entered via the keyboard, as the internal data. The external data stored in a personal computer is inputted into the tape printing apparatus via a cable. The printing mode is sets to either an internal printing mode in which printing is performed based on the internal data stored in the RAM or an external printing mode in which printing is performed based on the external data inputted from the personal computer via the cable. A printer block performs printing on a tape in the set printing mode. A CPU determines ON/OFF setting of an automatic power-off function of automatically turning off power. When a predetermined time period has elapsed without any input via the keyboard or from the personal computer after the automatic power-off function is determined to be on, the power is automatically turned off in response to a command from the CPU.

12 Claims, 8 Drawing Sheets

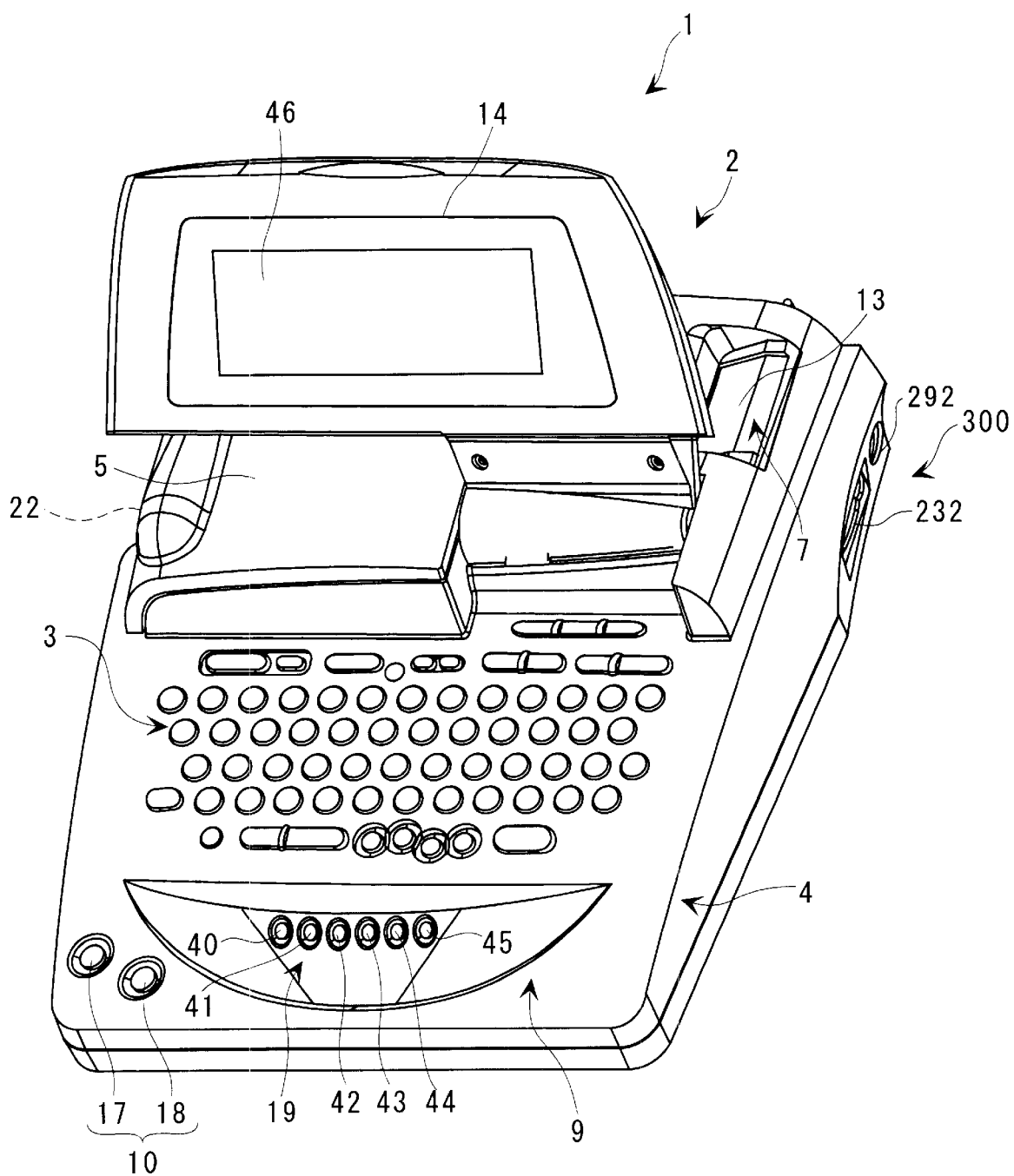
F I G. 2

PRINTING APPARATUS AND METHOD

BACKGROUND OF THE INVENTION

1. Field of the Invention

This invention relates to a printing apparatus and method which is capable of printing based on internal data stored within the apparatus or external data inputted from an external storage device.

2. Prior Art

Conventionally, printing apparatuses are widely used which print characters entered via a keyboard on a print medium, such as a tape or the like, to form labels. These printing apparatuses are relatively small in size, so that many of them employ a battery as a power supply. For this reason, there have been proposed printing apparatuses equipped with the automatic power-off function of turning off the power for the purpose of power conservation when a predetermined time period has elapsed without key entry.

The printing apparatuses of the above-mentioned kind include apparatuses having a capability of receiving print data from an external storage device incorporated e.g. in a personal computer (PC). In a printing apparatus of this type, however, even during inputting of data from the external storage device, the power can be automatically turned off because no key entry to the apparatus is performed.

Especially when the automatic power-off function is activated in a situation where a printing apparatus and an external storage device (personal computer) are connected to each other via a network, since these apparatus and device are located far apart from each other, a user using the external storage device has to take the trouble of going to a place where the printing apparatus is installed, so as to turn on the power thereof again.

SUMMARY OF THE INVENTION

It is an object of the invention to provide a printing apparatus and method which is capable of printing based on internal data stored within the apparatus or external data inputted from an external storage device, and at the same time capable of setting the enabling/disabling of an automatic power-off function.

To attain the above object, according to a first aspect of the invention, there is provided a printing apparatus for printing on a print medium based on internal data stored therein or external data inputted from an external storage device.

The printing apparatus according to the first aspect of the invention is characterized by comprising:

first input means for inputting data and various instructions;

internal storage means for storing the data inputted by the first input means, as the internal data;

second input means for inputting the external data stored in the external storage device;

printing mode-setting means for setting a printing mode to either an internal printing mode in which printing can be performed based on the internal data stored in the internal storage means or an external printing mode in which printing can be performed based on the external data inputted by the second input means;

printing means for printing on the print medium in the printing mode set by the printing mode-setting means;

determining means for determining whether an automatic power-off function of automatically turning off power should be enabled or disabled; and automatic power-off means for automatically turning off the power when a predetermined time period has elapsed without input by the first input means or by the second input means, if the determining means has determined that the automatic power-off function should be enabled.

To attain the above object, according to a second aspect of the invention, there is provided a printing method of carrying out printing based on internal data or external data inputted from an external storage device.

The printing method according to the second aspect of the invention is characterized by comprising the steps of:

inputting data and various instructions;

storing the inputted data as the internal data;

inputting external data stored in the external storage device;

setting a printing mode to either an internal printing mode in which printing can be performed based on the stored internal data or an external printing mode in which printing can be performed based on the inputted external data;

carrying out printing in the set printing mode;

determining whether an automatic power-off function of automatically turning off power should be enabled or disabled; and automatically turning off the power when a predetermined time period has elapsed without input of any of the internal data, the various instructions and the external data, if it has been determined that the automatic power-off function should be enabled.

In the printing apparatus and method according to the respective first and second aspects of the invention, it is possible to carry out printing based on the internal data stored within the apparatus or external data inputted from the external storage device, and at the same time select which of the internal data and the external data should be used for printing. Further, the printing apparatus not only has the automatic power-off function of automatically turning off power when the predetermined time period has elapsed without any input, but also the capability of determining whether the automatic power-off function should be enabled or disabled. Whether the automatic power-off function should be enabled or disabled may be automatically determined by following a predetermined rule or alternatively in response to an instruction by the user.

It is preferred that the determining means includes means for determining whether the automatic power-off function should be enabled or disabled according to the printing mode set by the printing mode-setting means.

Similarly, it is preferred that the step of determining whether the automatic power-off function should be enabled or disabled includes the step of determining whether the automatic power-off function should be enabled or disabled according to the set printing mode.

According to these preferred embodiments, it is possible to determine whether the automatic power-off function should be enabled or disabled, based on the set printing mode. Thus, whether the automatic power-off function should be enabled or disabled is automatically determined according to the set printing mode, which saves the user from having to set the enabling or disabling of the automatic power-off function.

It is preferred that the determining means includes means for determining that the automatic power-off function should be disabled when the external printing mode is set by the printing mode-setting means.

Similarly, it is preferred that the step of determining whether the automatic power-off function should be enabled or disabled includes determining that the automatic power-off function should be disabled when the printing mode has been set to the external printing mode.

According to these preferred embodiments, when the printing mode is set to the external printing mode, it is determined that the automatic power-off function should be disabled, so that it is possible to prevent the power from being automatically turned off. Therefore, the user is not required to carry out troublesome operation e.g. of turning on the power of the printing apparatus again.

Preferably, the printing apparatus further comprises automatic power-off instruction means for giving an instruction concerning determination as to whether the automatic power-off function should be enabled or disabled.

According to this preferred embodiment, it is possible to determine whether the automatic power-off function should be enabled or disabled in response to needs of the user.

More preferably, the determining means includes means for determining whether the automatic power-off function should be enabled or disabled according to the instruction given by the automatic power-off instruction means, regardless of the printing mode set by the printing mode-setting means.

According to this preferred embodiment, it is possible to determine whether the automatic power-off function should be enabled or disabled in response to an instruction by the user, regardless of the printing mode set by the printing mode-setting means. This means that priority is given to the demand of the user in determining whether the automatic power-off function should be enabled or disabled.

Alternatively, the determining means includes means for determining whether the automatic power-off function should be enabled or disabled based on the printing mode set by the printing mode-setting means, regardless of the instruction given by the automatic power-off instruction means.

According to this preferred embodiment, it is possible to determine whether the automatic power-off function should be enabled or disabled according to the printing mode set by the printing mode-setting means, regardless of an instruction by the user. This means that even if the user gives an erroneous instruction, it is possible to determine whether the automatic power-off function should be enabled or disabled properly in accordance with the printing mode.

Preferably, the printing apparatus further comprises power source type-detecting means for detecting a type of power source, and the determining means includes means for determining whether the automatic power-off function should be enabled or disabled based on a result of detection by the power source type-detecting means.

According to this preferred embodiment, it is possible to automatically determine whether the automatic power-off function should be enabled or disabled based on a result of detection by the power source type-detecting means, which saves the user from having to set the enabling or disabling of the automatic power-off function.

More preferably, the determining means includes means for determining that the automatic power-off function should be disabled when the type of the power source detected by the power source type-detecting means is an AC power supply.

According to this preferred embodiment, it is possible to determine that the automatic power-off function should be automatically disabled when the power supply type detected by the power source type-detecting means is an AC power supply, since the AC power supply causes little concern about power consumption, thereby saving the user from having to set the enabling and disabling of the automatic power-off function.

More preferably, the determining means includes means for determining that the automatic power-off function should be enabled when the type of the power source detected by the power source type-detecting means is a battery.

According to this preferred embodiment, it is possible to determine that the automatic power-off function should be automatically enabled for conservation of power if the power supply type detected by the power source type-detecting means is a battery. This makes it possible to prevent electric power from being wastefully used and save the user from having to set the enabling and disabling of the automatic power-off function.

Preferably, the printing apparatus further comprises determination-informing means for providing notification of a determination made by the determining means.

According to this preferred embodiment, the user can check by the determination-informing means whether the automatic power-off function is disabled or enabled.

Preferably, the print medium is a tape-shaped member.

According to this preferred embodiment, since the print medium is a tape-shaped member, the present invention can be applied to a tape printing apparatus, which facilitates the making of labels and the like. Further, since the print medium can be received in the printing apparatus in a state wound into a roll, it is possible to make the apparatus compact in construction.

The above and other objects, features, and advantages of the invention will become more apparent from the following detailed description taken in conjunction with the accompanying drawings.

BRIEF DESCRIPTION OF THE DRAWINGS

FIG. 2 is a perspective view of the appearance of the FIG. 1 tape printing apparatus with a cover assembly thereof open;

DETAILED DESCRIPTION OF PREFERRED EMBODIMENTS

The invention will now be described in detail with reference to the drawings showing a tape printing apparatus to which is applied a printing apparatus and method according to an embodiment of the invention. The tape printing apparatus of the invention is capable of printing based on internal data stored in the apparatus itself or external data inputted from an external storage device, such as a personal computer (hereinafter simply referred to as "PC"), and has an automatic power-off function (function of automatically turning off the power of the apparatus for power conservation when a predetermined time period has elapsed without any operation).

Figure 1:
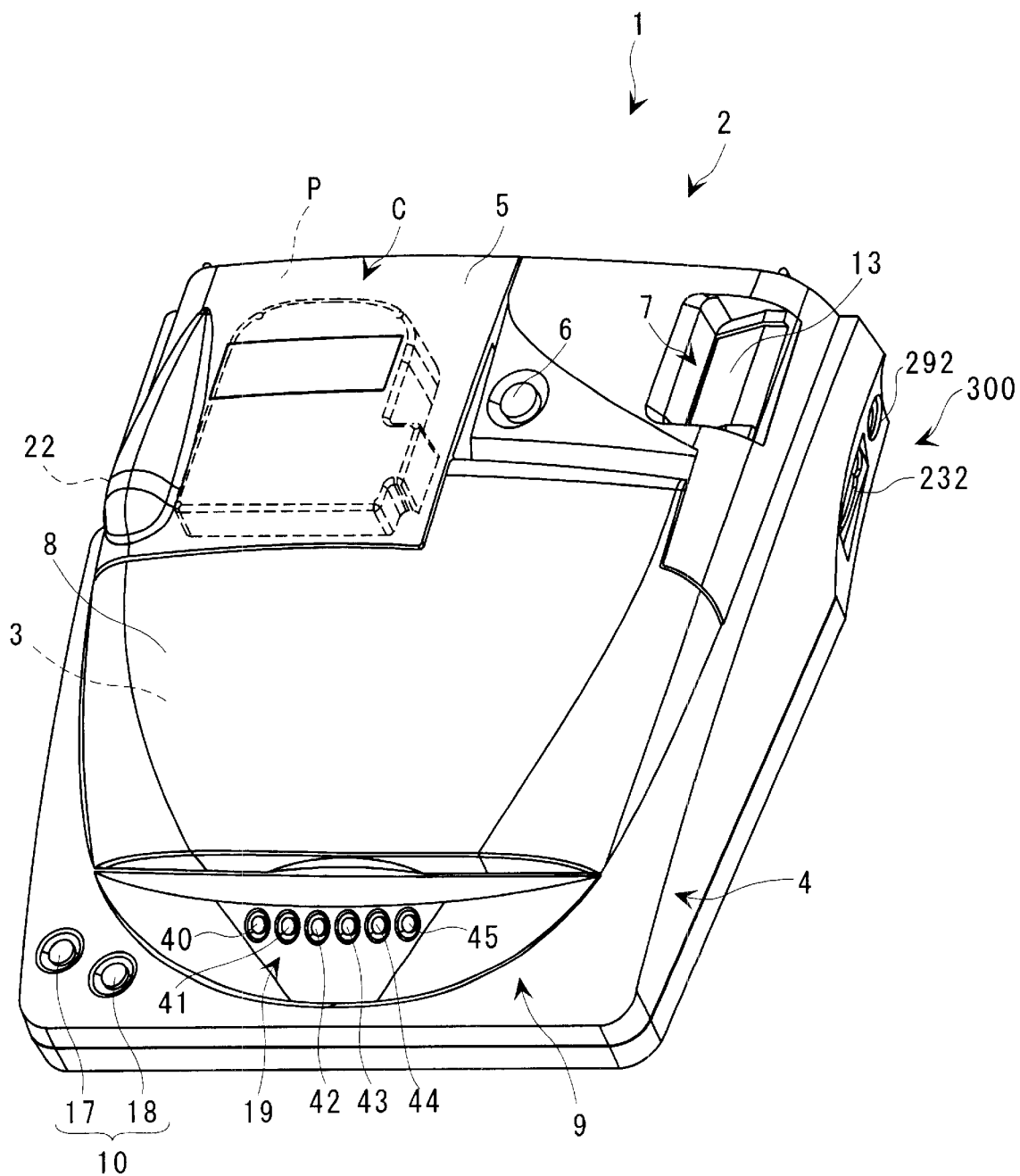
FIG. 1 is a perspective view of the appearance of a tape printing apparatus according to an embodiment of the present invention.

FIG. 1 shows the appearance of the whole tape printing apparatus 1 according to the present embodiment. FIG. 2 shows the tape printing apparatus 1 with a cover assembly 8 thereof open, while FIG. 3 shows the apparatus 1 with the cover assembly 8 thereof closed, and with a lid 5 thereof open and a tape cartridge C mounted therein.

Figure 3:
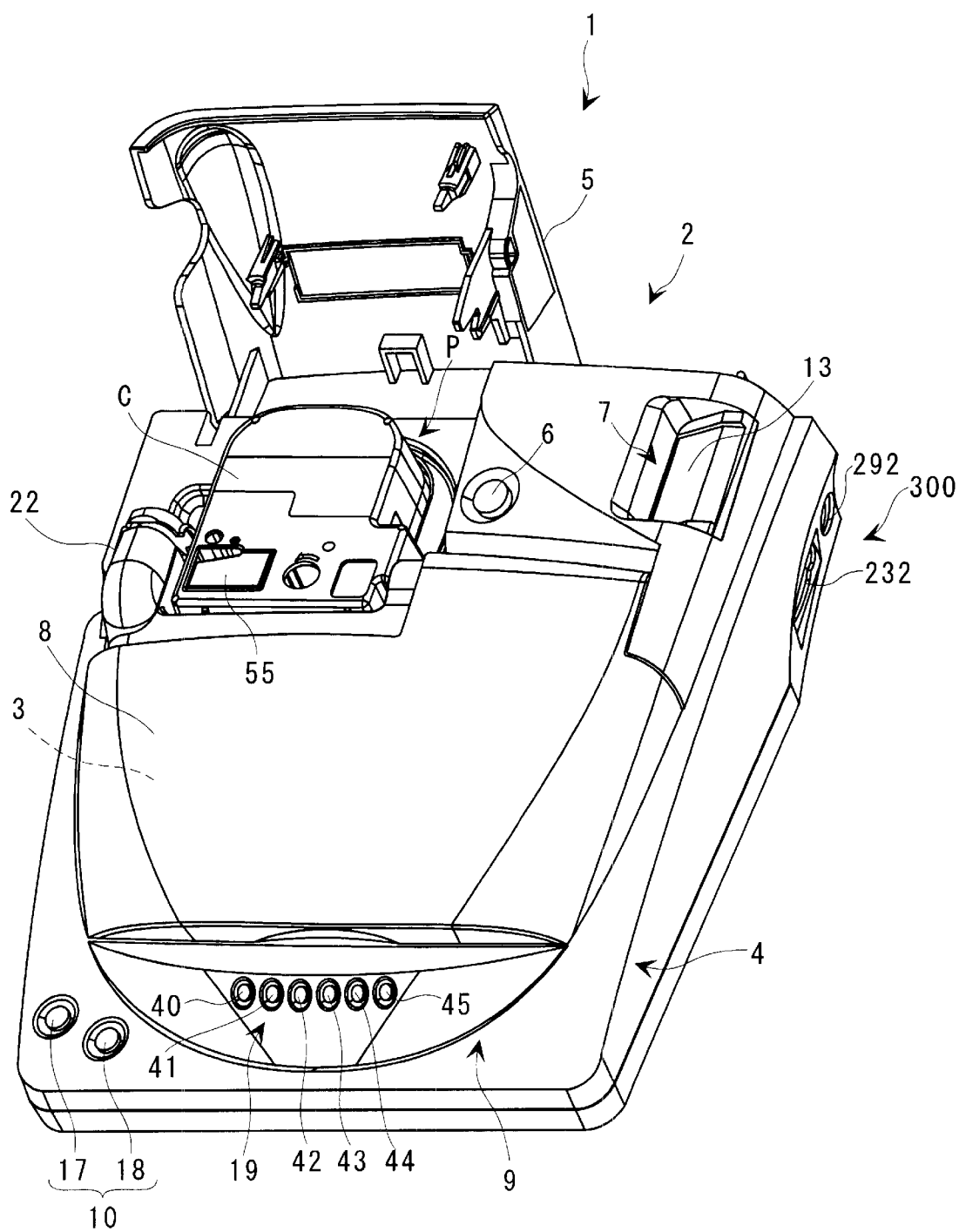
FIG. 3 is a perspective view of the appearance of the FIG. 1 tape printing apparatus with the cover assembly thereof closed, and with a lid thereof open and a tape cartridge mounted therein.

As shown in FIGS. 1 to 3, the tape printing apparatus 1 is comprised of a main unit 2 having an apparatus casing 4 forming an outer shell thereof, and the tape cartridge C removably mounted in the main unit 2. The main unit 2 is comprised of the lid 5 formed with a window, which is attached to the top of the rear left-hand portion of the apparatus casing 4, a lid-opening button 6 arranged at a location adjacent the right-hand side of the lid 5, for use in opening and closing the lid 5, a trimming device 7 arranged in the top of the apparatus casing 4 at a location rightward of the lid-opening button 6, the cover assembly 8 including a display 14 and mounted to the central portion of the apparatus casing 4 in a manner such that the cover assembly 8 can be opened and closed, and a crescent portion 9 including an information lamp group 19 and protruding upward from the apparatus casing 4 at a location forward of the cover assembly 8. Further, an exposed key group 10 comprised of two keys is arranged in the top of the apparatus casing 4 at a location leftward of the crescent portion 9, and a keyboard 3 which is covered by the cover assembly 8 when the cover assembly 8 is closed and exposed when the cover assembly 8 is opened is arranged in the same plane where the exposed key group 10 is arranged. Under the lid 5, there is formed a compartment P in which the tape cartridge C is removably mounted.

According to the tape printing apparatus 1, a user opens the lid 5 by operating the lid-opening button 6, mounts the tape cartridge C in the compartment P, opens the cover assembly 8 to thereby make the keyboard 3 accessible for key entry, and then operates the keyboard 3 while viewing the display 14. When the user enters printing information, such as desired characters (letters, numerals, symbols, simple figures, etc.) and instructs the apparatus 1 to perform a printing operation via the keyboard 3, a tape T is unwound from the tape cartridge C, and desired printing is conducted on the tape T by a print head 122 (see FIG. 5). The printed portion of the tape T delivered out via a tape exit 22 as the printing proceeds. When the desired printing is completed, the tape T is further advanced to a position corresponding to termination of a tape length (length of a label to be formed) including the length of margins, and then the feeding of the tape is stopped, followed by cutting off the portion of the tape T delivered out via the tape exit 22 with a tape cutter 132a or 132b (see FIG. 5).

The ends of the cut-off strip of the printing tape T thus formed can be trimmed by the trimming device 7. More specifically, if the user guides the tape T into a slit of the trimming device 7 along a tape-inserting guide 13 sloped inwardly downward from the top of the apparatus casing 4, a trimming mechanism of the device 7 automatically operates to trim the ends of the cut-off strip of the printing tape T into ones with a radius.

The tape T is comprised of an image-receiving layer Ta as a printing surface, an adhesive layer Tb coated on the underside surface of the image-receiving layer Ta, and a peel layer Tc peelably covering the underside surface of the adhesive layer Tb. The tape T and an ink ribbon R are fed or run such that they pass by a through hole 55, in a state lying one upon the other. Then, the tape T alone is delivered out of the tape cartridge C, whereas the ink ribbon R is taken up into a roll within the tape cartridge C. From the tape T delivered out of the apparatus, the peel layer Tc is peeled off, and then the tape T is affixed to an object article. It should be noted that in the tape printing apparatus 1, not only the tape T having the three-layer structure as described above but also a single-layer tape T such as a transfer tape can be used.

Figure 4:
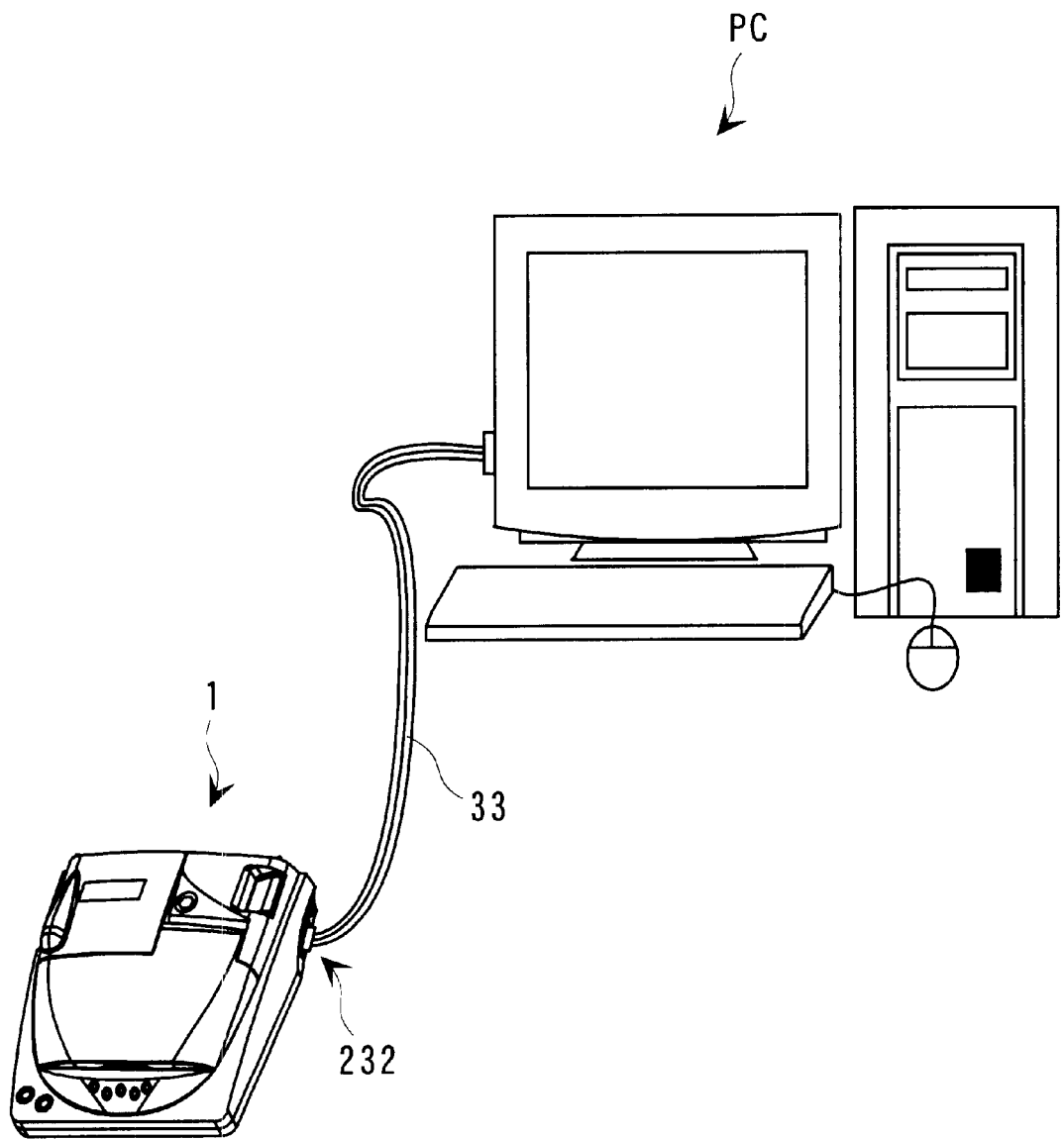
FIG. 4 is a view showing the FIG. 1 tape printing apparatus in a state connected to a personal computer.

Further, the apparatus casing 4 has a connection terminal block 300 formed at a location opposite to the tape exit 22. The connection terminal block 300 is comprised of an AC adapter jack 292 for connecting an AC adapter, not shown, thereto, and a data-in jack 232 for connecting thereto a cable 33 (see FIG. 4) which connects between the main unit 2 and the PC. The tape printing apparatus 1 is capable of switching between an "internal printing mode" in which printing can be carried out based on data stored in the apparatus 1 and an "external printing mode" in which printing can be carried out based on data inputted from the PC, in accordance with ON/OFF operation of a communication key 18, described in detail hereinafter. In the internal printing mode, data is inputted into the apparatus 1 by key entry via the keyboard 3. On the other hand, in the external printing mode, data inputted into the PC and edited in the same is inputted into the apparatus 1 via the cable 33 connecting between the main unit 2 and the PC as shown in FIG. 4. The tape printing apparatus 1 and the PC are placed in a communicative connection wait state by connecting between the main unit 2 and the PC by the cable 33, and the communicative connection wait state is switched to a communicative connection-enabled state by turning on the communication key 18.

When the tape printing apparatus 1 is communicatively connected to the PC as described above, it is not required to use the keyboard 3, and hence the keyboard 3 may be covered by the cover assembly 8 as shown in FIG. 1.

The information lamp group 19 is comprised of a plurality of indicator lamps arranged in the central portion of the crescent portion 9. More specifically, the indicator lamps include a printing indicator lamp 40, a power supply indicator lamp 41, a half-cutting indicator lamp 42, a communication indicator lamp 43, a trimming indicator lamp 44 and an automatic power-off indicator lamp 45 arranged in the mentioned order from the left as viewed in FIGS. 1 to 3, and each indicator lamp is lighted (turned on) and extinguished (turned off) in response to various operating states of the apparatus 1. The printing indicator lamp 40 is on during printing on the tape T and fully cutting through (performing through-cutting of) a printed portion of the tape T, while the half-cutting indicator lamp 42 is on when the apparatus is set to partially cut (perform half-cutting of) the leading edge of the tape T prior to printing so as to make the peel layer Tc easy to peel off. The communication indicator lamp 43 is on when the communication key 18, described in detail hereinafter, is on. Further, by default (initial setting), when the communication key 18 is on (i.e. during the external printing mode), the automatic power-off function is off (disabled), whereas when the communication key 18 is off (i.e. during the internal printing mode), the automatic power-off function is on (enabled). The trimming indicator lamp 44 is on during cutting and shaping of corners of a printed strip of the tape T by the trimming device 7, and the automatic power-off indicator lamp 45 is on when the automatic power-off function is on (enabled).

The two keys of the exposed key group 10 are a power key 17 and the communication key 18 arranged immediately adjacent to each other on the respective left-hand side and right-hand side. The power key 17 turns on and off the power of the main unit 2, while the communication key 18 enables and disables communicative connection between the apparatus 1 and the PC.

Figure 5:
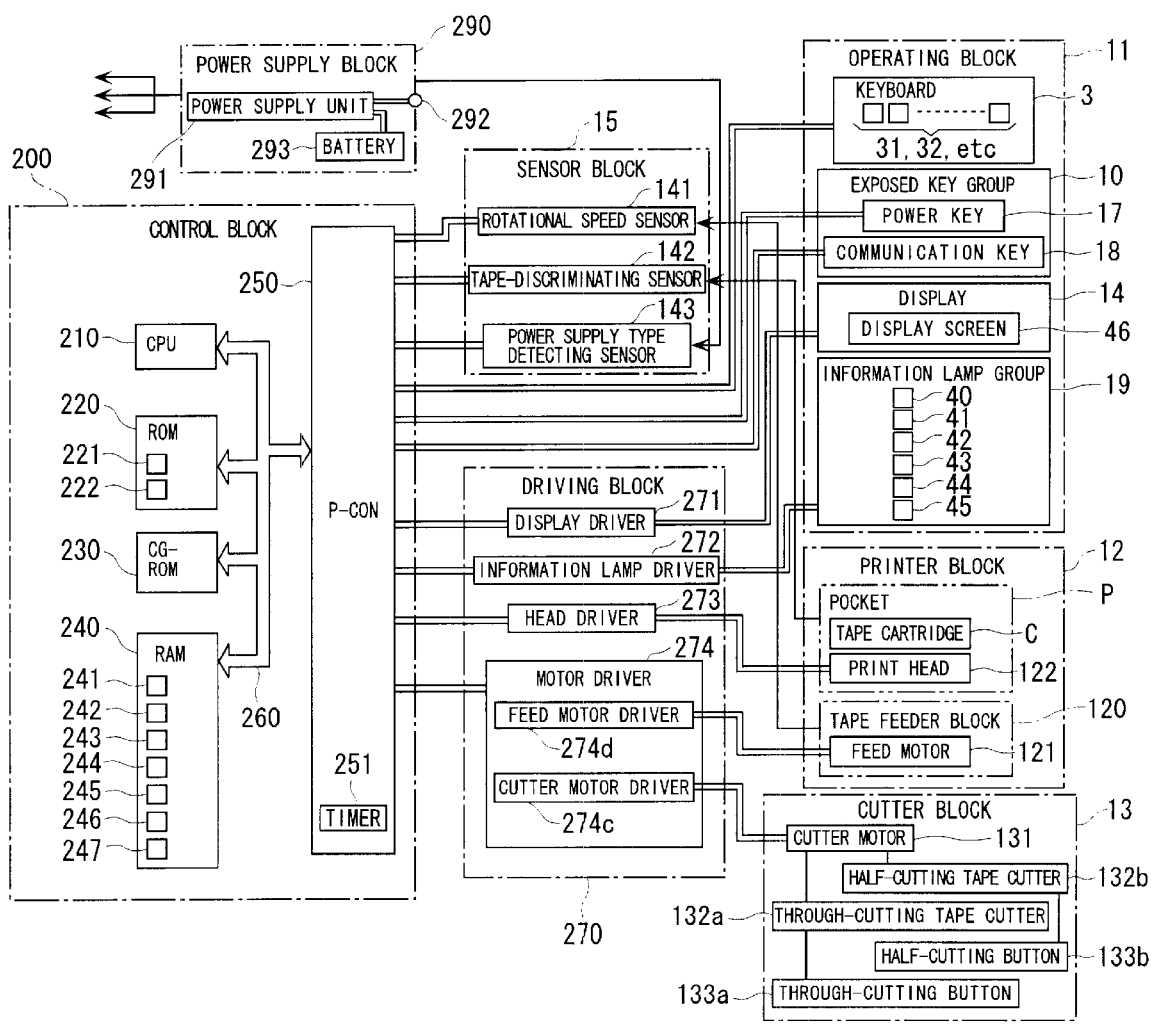
FIG. 5 is a block diagram showing the arrangement of a control system of the FIG. 1 tape printing apparatus.

Next, the basic arrangement of the control system of the printing apparatus 1 will be described. As shown in FIG. 5, the tape printing apparatus 1 is basically comprised of an operating block 11 having the keyboard 3 and the display 14 and interfacing with the user, a printer block 12 having a print head (thermal head) 122 and a tape feeder block 120 and performing printing on the tape T unwound from the tape cartridge C, a cutter block 13 for cutting off the printed portion of the tape T, a sensor block 15 having various sensors for carrying out various detecting operations, a driving block 270 having drivers for driving circuits of various devices, and a control block 200 for controlling operations of components of the tape printing apparatus 1. To implement this construction of the present embodiment, the apparatus casing 4 accommodates a circuit board, not shown, in addition to the printer block 12, the cutter block 13, the sensor block 15 and so forth. On the circuit board, there are mounted a power supply block 290, the circuits of the driving block 270 and the control block 200, etc.

The operating block 11 is comprised of the exposed key group 10, the keyboard 3, the display 14, and the information lamp group 19. When depressed by the user, the power key 17 and the communication key 18 of the exposed key group 10 each issue a command to the control block 200.

On the keyboard 3, there are arranged a character key group 31 including an alphabet key group, a number key group, and a nonstandard character key group for calling nonstandard characters for selection, as well as a function key group 32 for designating various operation modes. In a type of apparatus which is capable of entering the Japanese language, the character key group 31 includes a kana key group for entering Japanese hiragana letters and Japanese katakana letters, as well. The function key group 32 includes a print key for instructing the apparatus 1 to execute printing, a selection key for use in selecting a desired function from displayed menu options (or for use in selecting a desired kanji letter from candidate kanji letters presented in kana-kanji conversion which is executed by the type of apparatus capable of entering the Japanese language), a delete key for deleting characters designated by a cursor or canceling operations carried out for various functions, and four cursor keys (up arrow key, down arrow key, left arrow key, and right arrow key) for moving the cursor K in respective upward, downward, leftward, and rightward directions, to designate a position at which a character is entered next or a position at which operation is carried out.

Further, the function key group 32 includes a power management configuration key for configuring the power-off function. Needless to say, the above key entries may be made by provision of respective keys or by provision of a smaller number of keys which can be operated in combination with a shift key or the like. As shown in FIG. 5, various commands and data are inputted to the control block 200 via the keyboard 3.

The display 14 has a display screen 40 which is capable of displaying display image data of 96 by 64 dots on a rectangular display area of approximately 6 cm in the horizontal direction (X direction) by 4 cm in the vertical direction (Y direction). The display 4 is made use of by the user when he enters data via the keyboard 3 to form or edit print image data, such as character string image data, views the resulting data, and enters various commands including ones for selecting menu options via the keyboard 3.

Further, the printing indicator lamp 40, the power indicator lamp 41, the half-cutting indicator lamp 42, the communication indicator lamp 43, the trimming indicator lamp 44 and the automatic power-off indicator lamp 45 of the information lamp group 19 are each turned on and off by an information lamp driver 272 in a manner associated with corresponding operating states of the apparatus 1.

The tape feeder block 120 includes a feed motor 121 for feeding the tape T. The feed motor 121 has an end thereof rigidly fixed to a disc, not shown, formed with detection openings, and a rotational speed sensor 141 including a photo sensor or the like is arranged such that the sensor 141 faces the rotational path of the detection openings, for sending information of the rotational speed of the feed motor 121 detected thereby to the control block 200.

The printer block 12 has the compartment P formed under the lid 5, for receiving the tape cartridge C therein. The tape cartridge C can be mounted in or removed from the compartment P when the lid 5 is open. The tape cartridge C has a cartridge casing 51 holding the tape T and the ink ribbon R each having a predetermined width (approximately 4.5 to 48 mm). Further, the tape cartridge C is formed with the through hole 55 for receiving therein a head unit arranged in the compartment P. The tape cartridge C also has a plurality of small holes formed in the bottom thereof, for discrimination of a type of the tape T contained therein from the other types of the tape T having different widths, which are contained in other tape cartridges C. The compartment P has a tape-discriminating sensor 142, implemented e.g. by micro-switches, for detecting the above holes to thereby determine the type of the tape T set for use. It should be noted that a discrimination tape (which makes the cartridge distinguishable from the other types e.g. by a color thereof or a bar code thereon) may be affixed to the tape cartridge C for discrimination of the type of the tape T.

The cutter block 13 is comprised of the through-cutting tape cutter 132a for cutting through the tape T, the half-cutting tape cutter 132b for cutting only the image-receiving layer Ta and adhesive layer Tb of the tape T, cutting buttons 133a, 133b to be manually operated for causing the tape cutters 132a, 132b to cut the tape T e.g. in the case of a desired length printing, and a cutter motor 131 for automatically driving the tape cutters 132a, 132b to cut the tape T e.g. in the case of a fixed length printing. The tape printing apparatus 1 can be switched between a manual cutting mode and an automatic cutting mode by a cutting mode-setting operation. In the manual cutting mode, after completion of a printing operation, the user pushes the cutting buttons 133a, 133b arranged on the apparatus casing 4, whereby the tape cutters 132a, 132b are actuated to cut the tape T to a desired length. On the other hand, in the automatic cutting mode, after completion of a printing operation, the tape T is sent for additional feed by the length of a rear margin, and then stopped, whereupon the cutter motor 131 is driven to cut the tape T.

The sensor block 15 includes the rotational speed sensor 141, the tape-discriminating sensor 142, and a power supply type-detecting sensor 143. It should be noted that, to suit the actual requirements of the tape printing apparatus 1, the sensor block 15 can further include other sensors, such as a potential sensor which is connected to a power supply unit 291 of the power supply block 290 supplying power to each electric component of the tape printing apparatus 1, for detection of a change in the potential in the power supply unit 291. On the other hand, when the feed motor 121 of the printer block 12 is formed by a pulse motor, it is possible to omit the rotational speed sensor 141.

The power supply type-detecting sensor 143 detects a power supply type, and a CPU 210, referred to hereinafter, determines, based on the result of the detection, whether or not automatic power-off should be carried out to automatically turn off the power. More specifically, when the power supply type-detecting sensor 143 detects that the AC adapter connected to the AC power supply is connected to the AC adapter jack 292, referred to hereinafter, the CPU 210 gives an instruction for inhibiting the automatic power-off, whereas when the AC adapter connected to the AC power supply is not connected to the AC adapter jack 292, the CPU 210 gives an instruction for execution of the automatic power-off. The operation related to the automatic power-off will be described in detail hereinafter.

The driving block 270 is comprised of a display driver 271, the information lamp driver 272, a head driver 273, and a motor driver 274. The display driver 271 drives the display 14 of the operating block 11 in response to control signals delivered from the control block 200, i.e. in accordance with commands therefrom. Similarly, the information lamp driver 272 drives each lamp of the information lamp group 19, and the head driver 273 drives the print head 122 of the printer block 12, in accordance with commands from the control block 200. The motor driver 274 includes a feed motor driver 274d for driving the feed motor 121 of the printer block 12, and a cutter motor driver 274c for driving the cutter motor 131 of the cutter block 13. Similarly to the above drivers, the motor driver 274 drives each motor in accordance with commands from the control block 200.

The power supply block 290 is comprised of the power supply unit 291, the AC adapter jack 292 for connection to the AC adapter, not shown, which is connected to the AC power supply, and a battery 293 which can be mounted and removed from outside. The power supply unit 291 is connected to the AC adapter jack 292 and the battery 293. When the AC adapter connected to the AC power supply is connected to the AC adapter jack 292, the power supply unit 291 utilizes the AC power supply to supply power to the electric components of the tape printing apparatus 1, whereas when the AC adapter connected to the AC power supply is not connected to the AC adapter jack 292, the power supply unit 291 utilizes the battery 293 to provide power to the apparatus.

The control block 200 includes the CPU 210, a ROM 220, a character generator ROM (CG-ROM) 230, a RAM 240, a peripheral control circuit (P-CON) 250, all of which are connected to each other by an internal bus 260. The ROM 220 has a control program area 221 for storing control programs executed by the CPU 210 as well as a control data area 222 for storing control data including a character table, a color conversion table and a character modification table. The CG-ROM 230 stores bitmap data of symbols, figures and the like, which is provided for the tape printing apparatus 1. When code data specifying a character or the like is inputted thereto, it outputs the corresponding bitmap data.

The RAM (storage device) 240 is supplied with power by a backup circuit, not shown, such that stored data items can be preserved even when the power is turned off by operating the power key 17. The RAM 240 includes areas of a register group 241, a character data area 242 for storing character data of letters or the like entered by the user via the keyboard 3, a display image data area 243 for storing image data displayed on the display screen 46, a print image data area 244 for storing print image data, a registered image data area 245 for storing registered image data, as well as a print history data area 246 and conversion buffer areas 247 including color conversion buffers. The RAM 240 is used as a work area for carrying out various control processes.

The P-CON 250 incorporates logic circuits for complementing the functions of the CPU 210 and for handling interface signals for interfacing between the CPU 210 and peripheral circuits. The logic circuits are implemented by gate arrays, a custom LSI and the like. For instance, a timer 251 is incorporated in the P-CON 250 for the function of measuring elapsed time. Accordingly, the P-CON 250 is connected to the sensors of the sensor block 15 and the keyboard 3, for receiving the above-mentioned signals generated by the sensor block 15 as well as commands and data entered via the keyboard 3, and inputting these to the internal bus 260 directly or after processing them. Further, the P-CON 250 cooperates with the CPU 210 to output data and control signals inputted to the internal bus 260 by the CPU 210 or the like, to the driving block 270 directly or after processing them. In a state of the automatic power-off function being set to on (enabled), when the lapse of a predetermined time period is measured by the timer 251 incorporated in the P-CON 250, the CPU 210 instructs the power supply unit 291 to turn off the power.

The CPU 210 controls the overall operation of the tape printing apparatus 1. More specifically, the CPU 210 receives the signals from the sensor block 15, the commands and data inputted via the keyboard 3, etc. via the P-CON 250, according to the control programs read from the ROM 220, processes bitmap data from the CG-ROM 230 and various data stored in the RAM 240, and delivers control signals to the driving block 270 via the P-CON 250 to thereby carry out position control during printing operations, display control of the display screen 46, etc. Further, the CPU 210 causes the print head 122 to carry out printing on the tape T under predetermined printing conditions, and at the same time performs setting of the automatic power-off function according to the result of detection by the power supply type-detecting sensor 143 and the ON/OFF operation of the communication key 18.

Figure 6:
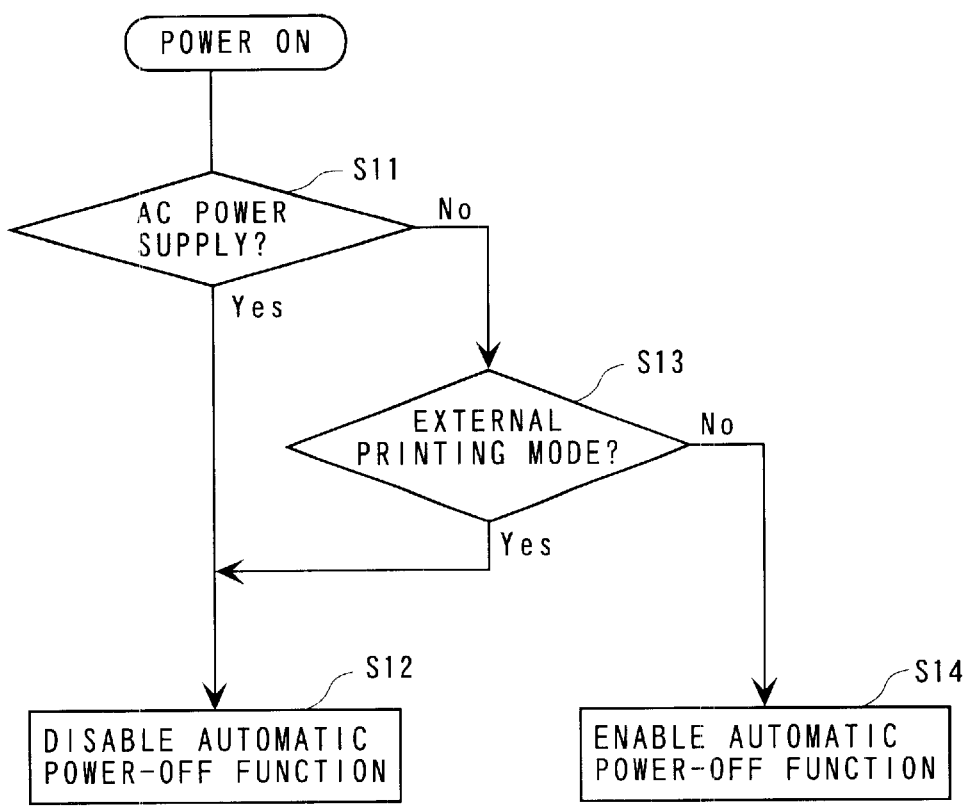
FIG. 6 is a flowchart showing an outline of a process of configuring an automatic power-off function of the FIG. 1 tape printing apparatus.

Now, description will be given of a process of configuring the automatic power-off function of the tape printing apparatus 1. As described above, the tape printing apparatus 1 of the present invention is capable of selectively enabling and disabling the automatic power-off function according to the type of an active source of the power and a printing mode set for use. In the following, a default configuration of the automatic power-off function (when power management configuration has not been executed by a user) will be described with reference to a flowchart shown in FIG. 6.

First, after the power is turned on by the user, it is detected at a step S11 whether or not the AC power supply is employed (i.e. whether or not the AC adapter connected to the AC power supply is connected to the AC adapter jack 292). If the AC power supply is employed (Yes to S11), the automatic power-off function is disabled at a step S12. On the other hand, if the AC power supply is not used (No to S11), it is determined at a step S13 whether or not the printing mode is the external printing mode. If the printing mode is the external printing mode (Yes to S13), the automatic power-off function is disabled at the step S12, whereas if the printing mode is not the external printing mode (i.e. if the printing mode is the internal printing mode) (No to S13), the automatic power-off function is enabled at a step S14.

Figure 7:
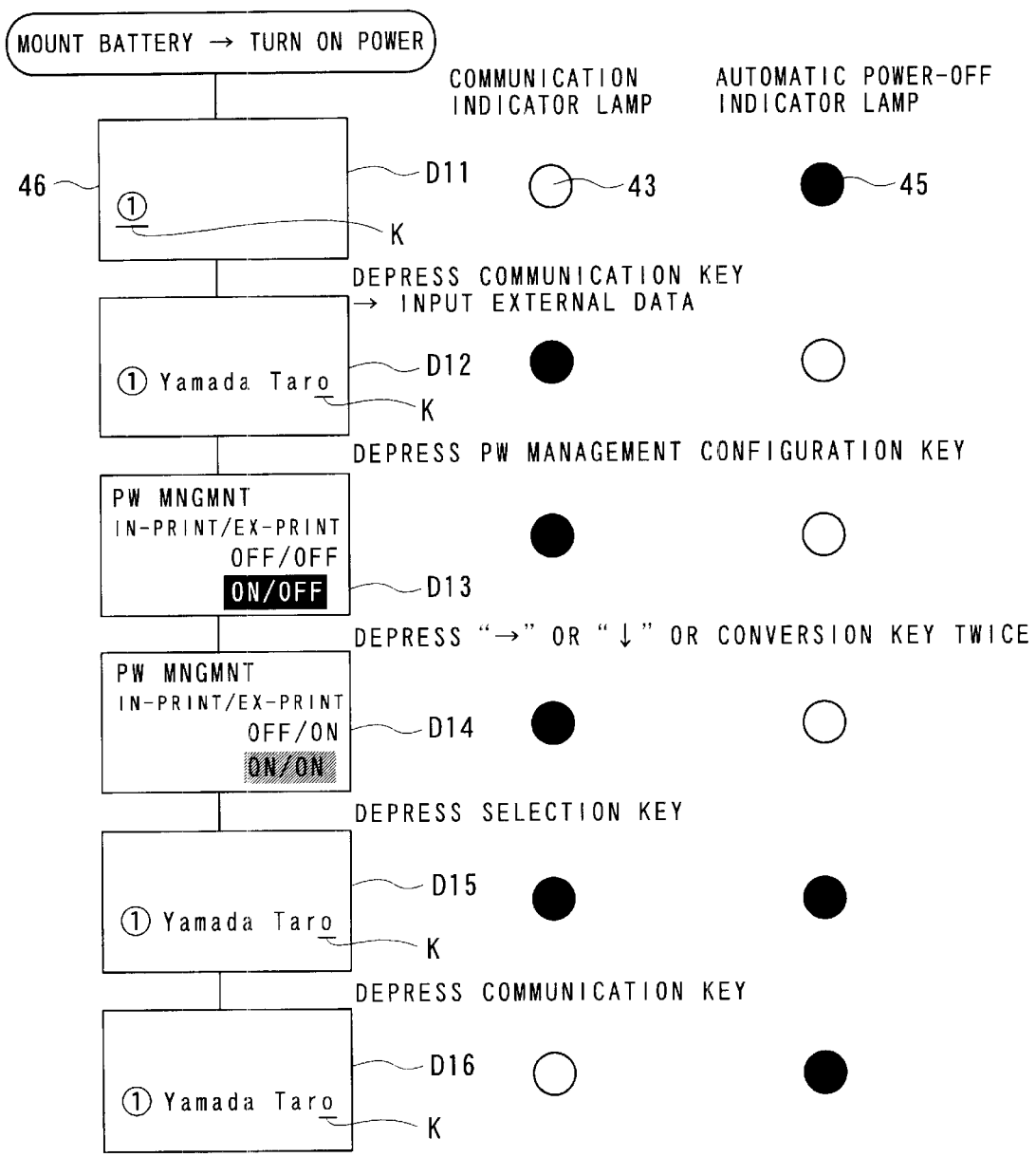
FIG. 7 is a diagram showing a sequence of screens displayed on a display screen of the FIG. 1 tape printing apparatus, which is useful in explaining an example of the process of configuring the automatic power-off function when a battery is mounted in the tape printing apparatus.

Next, an example of the process of configuring the automatic power-off function when the tape printing apparatus 1 has the battery mounted therein will be described in detail with reference to images displayed on the display screen 46. As shown in FIG. 7, when the battery is mounted by the user and the power is turned on, a text entry screen is displayed (D11). Reference numeral 1 in a circle in the image of the display screen 46 shows that an entry is on a first line of text data, and an underline attached to the numeral 1 in a circle represents the cursor K. In this example, since the printing mode is set to the internal printing mode by default, the communication indicator lamp 43 is on (represented by a hollow circle in the figure). Further, since the automatic power-off function is enabled during the internal printing mode by default, the automatic power-off indicator lamp 45 is on (represented by a black-filled circle in the figure).

When the user depresses the communication key 18 in this state (whereby the printing mode is switched to the external printing mode), and external data ("Yamada Taro" in the illustrated example) is received from the PC, the data is displayed on the display screen 46 (D12), and the communication indicator lamp 43 is turned on. At this time, since the automatic power-off function is set to be disabled during the external printing mode by default, the automatic power-off indicator lamp 45 is turned off.

Subsequently, when the power management configuration key is depressed by the user, character strings "PW MNG-MNT" (abbreviation for "power management configuration") and "IN-PRNT/EX-PRNT" are displayed on an upper portion of the display screen 46 (D13). The "IN-PRNT" represents the "internal printing mode", while the "EX-PRNT" represents the "external printing mode". Further, combinations of ON (enabling) and OFF (disabling) of the automatic power-off function during the respective printing modes are displayed as options (there are four options "OFF/OFF", "ON/OFF", "OFF/ON" and "ON/ON" in the present embodiment, and only the first two of them are shown in the image D13), with the combination of "ON/OFF" set by default being highlighted. The combination of "ON/OFF" indicates that the automatic power-off function is enabled during the internal printing mode, while it is disabled during the external printing mode.

In the illustrated example, the user depresses a cursor key (the right arrow key or the down arrow key) or a conversion key twice and then depresses the selection key in a state of the option "ON/ON" being displayed in a shade manner (D14). Therefore, in this case, the power management configuration is carried out such that the automatic power-off function is enabled during both of the internal printing mode and the external printing mode. When the option is thus selected on the screen for "power management configuration", the display screen 46 is switched to the text entry screen, and the automatic power-off indicator lamp 45 is turned on (D FIG. 15).

When the user depresses the communication key 18 at this time, the printing mode is switched from the external printing mode to the internal printing mode with the display screen 46 remaining the same, and the communication indicator lamp 43 is turned off (D16). The automatic power-off indicator lamp 45 remains on because the automatic power-off function has been set such that it is enabled during the internal printing mode as well (see D14) (that is, in this state of configuration of the apparatus, as long as the power management configuration remains unchanged, the automatic power-off function keeps working even if the printing mode is switched).

As described above, in the printing apparatus and method of the present invention, it is possible to configure the automatic power-off function such that it is enabled or disabled in dependence on the printing mode (the internal printing mode or the external printing mode) to meet the user's needs. Further, by default, i.e. without execution of power management configuration in association with the printing mode (see D13 and D14 in FIG. 7), the enabling/disabling of the automatic power-off function is automatically determined (see S13 in FIG. 6, etc.) in accordance with the printing mode set for use, which makes it possible to save the user from having to configure the enabling/disabling of the automatic power-off function. Moreover, by default, the automatic power-off function is disabled when the user sets the printing mode to the external printing mode, which prevents the power of the tape printing apparatus from being automatically turned off during inputting of external data. Therefore, the user is not required to carry out troublesome operation e.g. of turning on the power of the tape printing apparatus again.

Figure 8:
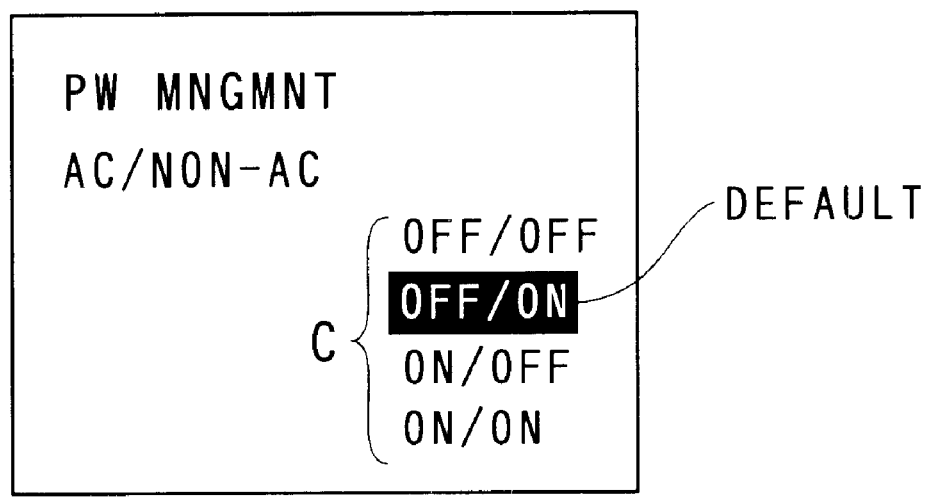
FIG. 8 is a diagram which is useful in explaining a process of configuring the automatic power-off function according to a power supply type.

Although in the above embodiment, the automatic power-off function is disabled when the AC power supply is employed, the automatic power-off function may be enabled in response to user's instructions. Further, in this case, as shown in FIG. 8, the printing apparatus may be configured such that the enabling/disabling configuration of the automatic power-off function can be set by selecting one of a plurality of options C associated with of the power sources (in the illustrated example, "AC" (AC power supply) and "NON-AC" (power supply other than AC power supply)). According to this configuration of the apparatus, it is possible to carry out the enabling/disabling configuration of the automatic power-off function to meet the user's needs.

In this case, it is preferred that the option "OFF/ON" is set by default. The reason for this is that in the case of employing the AC power supply (which causes little concern about power consumption), it is advantageous to disable the automatic power-off function, whereas in the case of employing a power supply (e.g. a battery) other than the AC power supply, it is effective (for power conservation) to enable the automatic power-off function.

Further, although in the above embodiment, the enabling/disabling of the automatic power-off function dependent on the printing mode can be set (instructed) according to the user's request, it is also possible to configure the apparatus such that the enabling/disabling of the automatic power-off function is set according to the printing mode set for use regardless of an instruction by the user. More specifically, in the case of inputting and printing external data, even if the user gives an erroneous instruction e.g. for enabling the automatic power-off function by mistake against his/her intention of disabling the automatic power-off function, the enabling/disabling of the automatic power-off function (disabling in this case) can be properly set according to the printing mode set for use.

Further, the apparatus may be configured such that prioritization of a user's instruction, a printing mode set for use, and a detected type of a power source, in setting the enabling/disabling of the automatic power-off function, can be selectively changed. This method makes it possible to provide a printing apparatus which meets the user's needs more than ever.

Moreover, although in the above embodiment, whether the automatic power-off function is enabled or disabled can be checked by the lighted (ON) or extinguished (OFF) state of the automatic power-off indicator lamp 45, this is not limitative, but other indicators, a message displayed on the display screen 46, or the like may be used for the same purpose in place of the automatic power-off indicator lamp 45.

Although in the above embodiment, the tape printing apparatus is described by way of example, this is not limitative, but the printing method of the present invention (method of configuring the automatic power-off function) can be applied to other electronic apparatuses.

It is further understood by those skilled in the art that the foregoing is a preferred embodiment of the invention, and that various changes and modifications may be made without departing from the spirit and scope thereof.

What is claimed is:

1. A printing apparatus for printing on a print medium based on internal data stored therein or external data inputted from an external storage device, the printing apparatus comprising:
    first input means for inputting data and various instructions;
    internal storage means for storing the data inputted by said first input means, as the internal data;
    second input means for inputting the external data stored in the external storage device;
    printing mode-setting means for setting a printing mode to either an internal printing mode in which printing can be performed based on the internal data stored in said internal storage means or an external printing mode in which printing can be performed based on the external data inputted by said second input means;
    printing means for printing on the print medium in the printing mode set by said printing mode-setting means;
    determining means for determining whether an automatic power-off function of automatically turning off power should be enabled or disabled; and
    automatic power-off means for automatically turning off the power when a predetermined time period has elapsed without input by said first input means and by said second input means, if said determining means has determined that the automatic power-off function should be enabled;
    said determining means including means for determining whether the automatic power-off function should be enabled or disabled according to the printing mode set by said printing mode-setting means.

2. A printing apparatus according to claim 1, wherein said determining means includes means for determining that the automatic power-off function should be disabled when the external printing mode is set by said printing mode-setting means.

3. A printing apparatus according to claim 1, further comprising automatic power-off instruction means for giving an instruction concerning determination as to whether the automatic power-off function should be enabled or disabled.

4. A printing apparatus according to claim 3, wherein said determining means includes means for determining whether the automatic power-off function should be enabled or disabled according to the instruction given by said automatic power-off instruction means, regardless of the printing mode set by said printing mode-setting means.

5. A printing apparatus according to claim 3, wherein said determining means includes means for determining whether the automatic power-off function should be enabled or disabled based on the printing mode set by said printing mode-setting means, regardless of the instruction given by said automatic power-off instruction means.

6. A printing apparatus according to claim 1, further comprising power source type-detecting means for detecting a type of power source, and
    wherein said determining means includes means for determining whether the automatic power-off function should be enabled or disabled based on a result of detection by said power source type-detecting means.

7. A printing apparatus according to claim 6, wherein said determining means includes means for determining that the automatic power-off function should be disabled when the type of the power source detected by said power source type-detecting means is an AC power supply.

8. A printing apparatus according to claim 6, wherein said determining means includes means for determining that the automatic power-off function should be enabled when the type of the power source detected by said power source type-detecting means is a battery.

9. A printing apparatus according to claim 1, further comprising determination-informing means for providing notification of a determination made by said determining means.

10. A printing apparatus according to claim 1, wherein said print medium is a tape-shaped member.

11. A printing method of carrying out printing based on internal data or external data inputted from an external storage device, the printing method comprising the steps of:
    inputting data and various instructions;
    storing the inputted data as the internal data;
    inputting external data stored in the external storage device;
    setting a printing mode to either an internal printing mode in which printing can be performed based on the stored internal data or an external printing mode in which printing can be performed based on the inputted external data;
    carrying out printing in the set printing mode;
    determining whether an automatic power-off function of automatically turning off power should be enabled or disabled;
    automatically turning off the power when a predetermined time period has elapsed without input of the internal data, the various instructions, and the external data, if it has been determined that the automatic power-off function should be enabled; and
    determining whether the automatic power-off function should be enabled or disabled according to the set printing mode.

12. A printing method according to claim 11, wherein the step of determining whether the automatic power-off function should be enabled or disabled includes determining that the automatic power-off function should be disabled when the printing mode has been set to the external printing mode.

* * * * *